April 9, 1957      L. F. CONWAY      2,787,832

PLASTIC MATERIALS CUTTING MACHINE

Filed Nov. 15, 1954      2 Sheets-Sheet 1

INVENTOR
LOWELL F. CONWAY

INVENTOR
LOWELL F. CONWAY

United States Patent Office 2,787,832
Patented Apr. 9, 1957

2,787,832

PLASTIC MATERIALS CUTTING MACHINE

Lowell F. Conway, Osceola, Ark., assignor to Osceola Foods, Inc., Osceola, Ark., a corporation of Arkansas Application November 15, 1954, Serial No. 468,697

13 Claims. (Cl. 31—14)

This invention relates to certain new and useful improvements in machines for accurately cutting materials, particularly in a plastic condition, into segments of pre-determined size, and more particularly relates to a machine for thus cutting plastic solid or semi-solid oleaginous materials such as margarine, butter, and the like.

In the production of material such as margarine, commonly the elements from which the finished product is produced are mixed or blended in a liquid or semi-liquid condition and are delivered under pressure to a crystallizing unit in which the temperature of the blended and mixed materials is lowered to produce a solid or semi-solid plastic mass which must be subsequently divided into portions of convenient size for subsequent packaging. There have heretofore been attempts for mechanically severing portions of desired size from an extruded mass of such plastic material, but in general the prior machines have lacked the accuracy necessary for properly severing portions of such plastic material from the mass, and additionally have failed properly to provide for proper synchronization between the steps of the operation and have accordingly proven inefficient of accomplishing the desired purpose. In addition, prior machines have failed to properly provide for adjustment of cutting controls so as to render the prior machines substantially incapable of convenient alteration to produce severed portions of varying sizes as desired.

The principal object of the present invention is to provide a machine for cutting plastic materials accurately into portions of pre-determined size.

A further object of the invention is to provide such a machine in which the cutting means are associated with a crystallization unit and the cutting means are activated responsive to the extrusion of a plastic material portion having the desired size.

A further object of the invention is to provide such a device having controls for coordinately controlling the inflow of plastic material to the crystallizing unit to interrupt extrusion during cutting.

A further object of the invention is to provide such cutting means in which the relative position of the control means may be adjusted to produce plastic material portions of desired varied size or length.

A further object of the invention is to provide a new and novel cutting means for severing portions of a plastic material such as margarine from a mass thereof; and A further object of the invention is to generally improve the design, construction and efficiency of devices for severing masses of plastic materials.

The means by which the foregoing and other objects of the present invention are accomplished and the manner of their accomplishment will be readily understood from the following specification upon reference to the accompanying drawings, in which.

Figure 1:
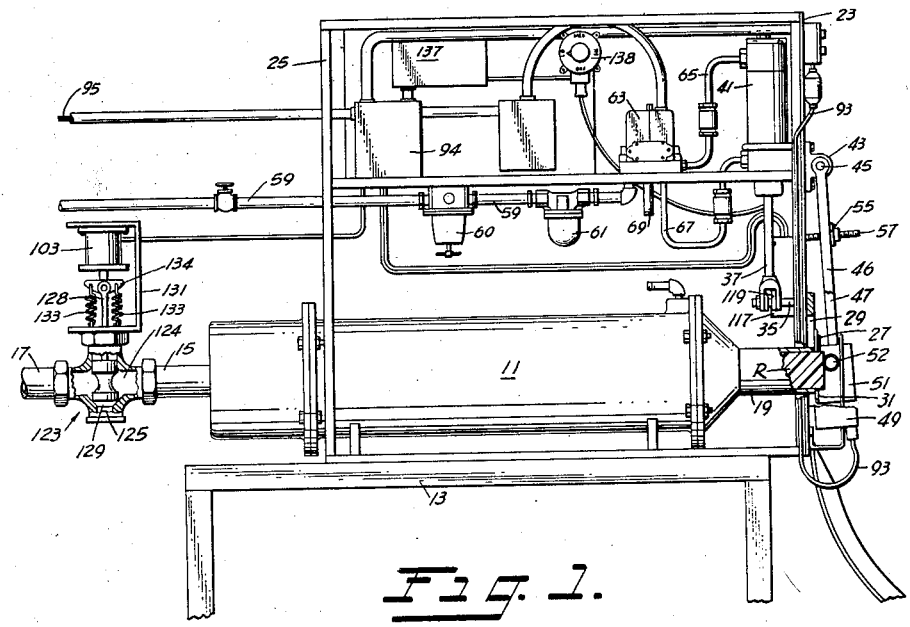
Fig. 1 is a side elevational view of the present invention with certain parts broken away for purposes of illustration.

Referring now to the drawings in which the various parts are indicated by numerals, the present invention is illustrated in use in the division of a mass of margarine into segments or pats of a substantially cylindrical nature. A jacketed crystallizing unit 11 of a type conventionally employed in the margarine industry is supported upon a suitable support 13. Unit 11 in conventional manner is internally chambered and is provided at its rear end with an inlet pipe 15 which is connected to a delivery conduit 17 leading from a source of margarine not shown. At its opposite or front end, unit 11 is provided with a restricted cylindrical nozzle 19 which terminates at its outer end in an extrusion orifice 21. The crystallizing unit 11 is adapted to receive margarine from delivery pipe 17 through margarine inlet pipe 15 which is delivered under pressure usually of the nature of 250 pounds per square inch, and in preferred practice the margarine is delivered to the crystallizing unit in a plastic or semi-plastic condition at a temperature of approximately 50 degrees Fahrenheit. The margarine thus delivered into the crystallizing unit flows thereinto under the delivering pressure and is constricted at the outlet from the unit into the nozzle 19 and is extruded from orifice 21 as a rod of margarine, which in the present instance is a cylindrical rod. Inasmuch as orifice 21 is open to atmosphere it affords no impedance to the flow movement of the margarine rod therethrough. It will be understood that while nozzle 19 and orifice 21 are shown as of circular cross section to produce a cylindrical rod, nozzles having orifices of other shapes and/or sizes may be employed as desired.

Nozzle 19 extends a minor distance forwardly through an upstanding plate 23 which is disposed perpendicularly to the longitudinal axis of nozzle 19. Plate 23 is preferably supported from support 13 and a superstructure frame 25.

Mounted on the front face of plate 23 adjacent its lower edge and embracing the projecting end of nozzle 19 are a pair of channel guides 27 which respectively face toward the nozzle 19. Guides 27 slidably support the opposite legs of a horseshoe or U-shaped harp 29, the harp 29 carrying a cutter wire 31 extending horizontally between the lower ends of the legs of the harp and lying substantially flush with the plane in which nozzle 19 terminates, the harp being reciprocable in guides 27 to move the cutter wire alternately upwardly and downwardly across orifice 21. Above nozzle 19, plate 23 is provided with a vertical slot 33 which is substantially centered over nozzle 19 and terminates at its lower end above the nozzle, slot 33 being provided to receive and guide the reciprocable movement of a connector 35 rigidly fixed to the rear of harp 29 at the upper portion of the harp and projecting rearwardly therefrom through slot 33.

At its rear end connector 35 is fixed to the lower end of a piston rod 37 carried by a piston 39 mounted in a double-action air pressure cylinder 41, the piston and cylinder assembly being adapted in opposite activation to effect reciprocation of piston rod 37 and connector 35, and consequently of the harp and cutter wire, moving the cutter wire, moving the cutter wire across orifice 21.

A pair of bearings 43, fixed to the forward face of plate 23, journalledly and rockably support a horizontal rod 45, to the opposite ends of which rod depending arms 46, 47 are rigidly fixed.

To one of the arms, as the arm 46, a photo-electric unit 49 is fixed, and to the opposite arm a light source 51 is likewise fixed. Unit 49 and light source 51 are positioned with the light emitting lens 52 of light source 51 horizontally alined with and facing toward the light receiving lens 53 of unit 49. It will be observed that lens 52 and lens 53 are horizontally alined forwardly of orifice 21 and above the plane which intersects the center of the orifice. Preferably adjustable spacer means are provided to establish and maintain a desired spacing of the photo-electric means forwardly of the orifice. Thus for example a bracket 55 is fixed to one of the arms, as the arm 46, and projects inwardly to extend beyond one of the edges of plate 23. An adjustment spacer screw 57 is threadedly engaged with bracket 55 and is preferably provided with a suitable knob for ready rotation. The rear end of screw 57 abuts against plate 23 and serves to space the arms 46, 47 at a desired distance from plate 23 so as concurrently to position photo-electric unit 49 and beam source 51 at a selected distance forwardly from orifice 21.

Air under pressure for the activation of the piston and cylinder assembly is supplied through an air line 59 from a suitable source of compressed air such as a compressor, not shown. Compressed air is preferably introduced to a pressure regulator 60, thence through an oiler 61 to a solenoid controlled four-way air valve 63. One air flow port 63A of air valve 63 is fluidly communicated with the upper end of the interior of cylinder 41 as by a pipe 65, and another port 63B of the air valve 63 is connected to the opposite end of the interior of cylinder 41 as by a pipe 67. The connections of the pipes 65, 67 to cylinder 41 are respectively above and below piston 39 so that upon alternate delivery of compressed air through the respective pipes 65, 67 opposite movement of the piston 39 is effected. Preferably air valve 63 is provided with an exhaust vent 69 and the air valve is of a conventional type in which shift of the valve positions is accomplished by a rocker 71 fixed to a valve stem 73 and positioned for alternate engagement by the armatures 75, 76 of electrically operated solenoids 77, 78 mounted externally of air valve assembly 63. It will be understood that upon shift of the valve rocker to one position, one of the pipes, as the pipe 65, is communicated through the valve assembly with the air under pressure delivered through air line 59, and the other of the pipes, as the pipe 67, is communicated with the exhaust vent 69, thus providing for forcing the piston downwardly, and upon opposite shift of the rocker the connections are reversed to move the piston upwardly.

Included in the photo-electic unit 49 is a conventional light-sensitive tube 81 alined with lens 53 and coupled through the usual resistors 81A and condenser 81B to an amplifier tube 83. The anode of amplifier tube 83 is coupled as by a lead 85 to one side of the coil 87 of a suitable relay, the relay including an operating switch 89. Electrical power is supplied to photo-electric unit 49 as by leads 91, 92, preferably in a cable 93 from a suitable transformer 94, the transformer 94 being electrically coupled as by leads 95 to a suitable source of conventional electric current of the nature of 110 volts, the source not being specifically shown. The opposite side of relay coil 87 is connected by a lead 97 to the lead 92 and thus to the source of power.

Switch 89 is normally closed during deenergized condition of the relay and is preferably spring-urged to return to closed position. In such closed position switch 89 completes an electrical coupling between a lead 99, also connected into the lead 92, and a lead 101 connected to one side of a solenoid 103, the employment of which will be hereinafter referred to, the opposite side of solenoid 103 being coupled by a lead 105 to lead 91. Thus it will be seen that the closure of switch 89 completes the circuit to solenoid 103, electrically connecting the solenoid to the transformer and energizing the solenoid.

Each of the solenoids 77, 78 are connected at one side to the lead 91 as by leads 106, 107. The opposite side of solenoid 77 is connected by a lead 109 to the lead 101 from relay switch 89, the coupling being interposed between switch 89 and solenoid 103. The opposite side of solenoid 78 is connected to lead 109 by a lead 111, and through the lead 109 is connected to lead 101. A normally open limit switch 113 is interposed in lead 109, and a similar normally open limit switch 115 is interposed in lead 111. It will be seen that solenoid 77 is energized when switch 113 is closed and upon closure of switch 89, and similarly that solenoid 78 is energized when switch 115 is closed and upon closure of switch 89.

The limit switches 113, 115 are preferably mounted in a switch-box 117 supported on the rear face of plate 23 with the switches, which may be of the spring loaded, depressible button type, being respectively positioned in the path of an abutment 119 mounted on the lower end of piston rod 37 and preferably comprising a roller supported on connector 35. The limit switches 113, 115 are respectively vertically spaced apart for engagement by abutment 119 at the respective completion of the piston upstroke and downstroke under air activation of the piston and cylinder assembly, such engagement by the abutment 119 effecting closure of the normally open switch 113 or 115 engaged thereby.

Light energizing power is supplied from transformer 94 through leads 120, 121, preferably encased in cable 122, to the light source 51, for producing a beam of light adapted to activate photo-sensitive tube 81 in conventional manner. It will be seen that when light source 51 is energized to produce the beam of light, the photo tube 81 is activated, and the arrangement of the electric eye unit 49 is such that it is biased upon activation of the photo tube to energize the relay coil 87, thus moving relay switch 89 into open position and interrupting the circuits to the respective solenoids 77, 78, 103.

Interposed between margarine delivery pipe 17 and chamber inlet pipe 15 is an exhaust fitting 123, the main body of which includes a passageway 124 which effects communication between pipes 15 and 17. Downwardly the fitting 123 is provided with a relief port 125 open to atmosphere, which internally includes a valve seat 127. A plunger 128 is mounted in fitting 123 transversely of passage 124, and the plunger 128 extends upwardly beyond the upper end of fitting 123. Carried on plunger 128 is a valve 129 adapted to seat on valve seat 127 and close off relief port 125, the plunger and valve being reciprocable in the fitting for shift into and out of port closing position. Valve 129 is uniformly reduced intermediate its length so as to permit margarine flow evenly around the body of the valve through passage 124 when the valve is in port closing position (Fig. 1), movement of the valve to port open position (Fig. 3) diverting the flow of margarine downwardly through relief port 125 and interrupting delivery of margarine to inlet 15.

Figure 3:
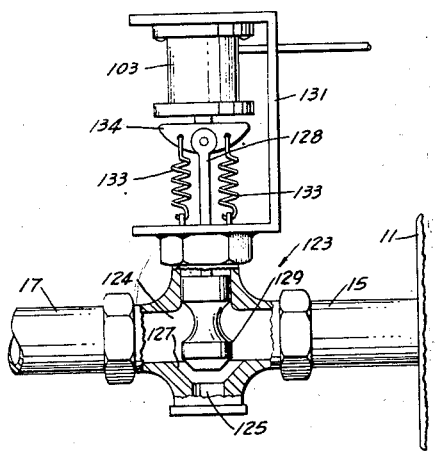
Fig. 3 is an enlarged fragmentary view, partly in section and partly in elevation, illustrating the preferred inflow valve means on an enlarged scale.
Figure 4:
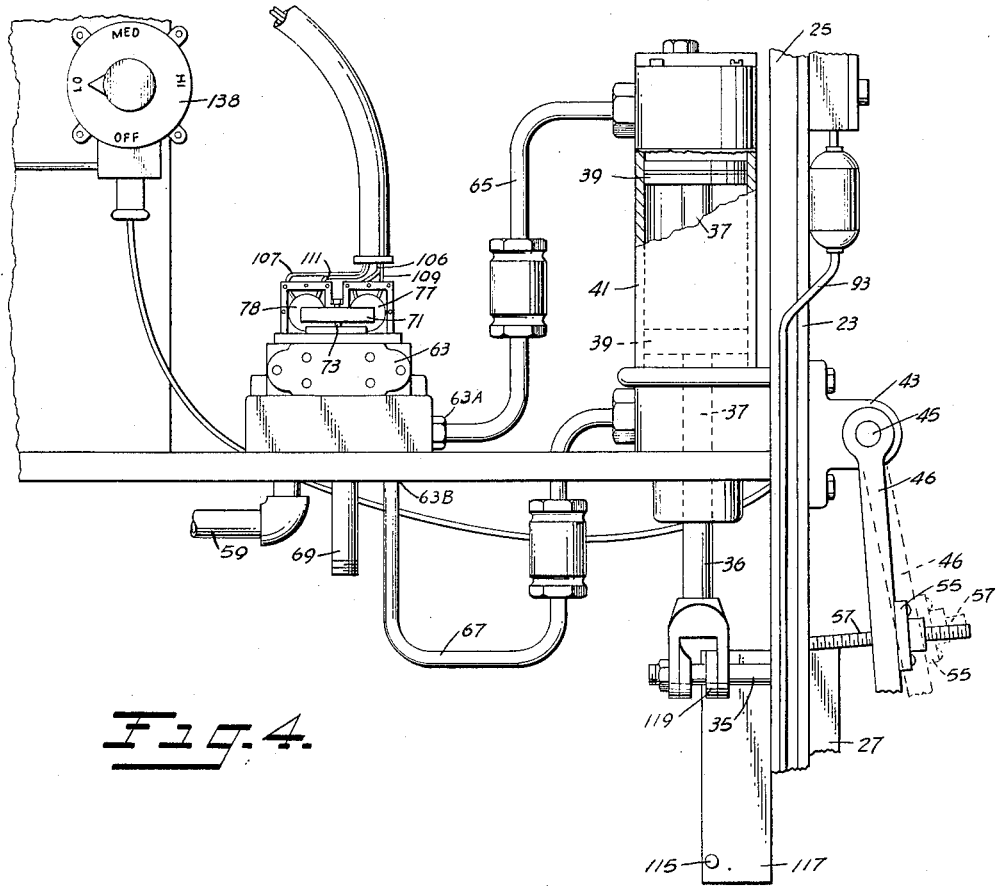
Fig. 4 is an enlarged fragmentary side elevational view illustrating further details of the invention.

Solenoid 103 is supported from a bracket 131 mounted on fitting 123, and the armature of the solenoid which is connected to the upper end of plunger 128, is adapted for retraction upon energization of solenoid 103 to raise plunger 128 and valve 129 to port open position as shown in Fig. 3. Such retraction of the armature upon energization of the solenoid effects the plunger movement against the action of return spring means, preferably in the form of a pair of tension springs 133 which are respectively connected at one end to the lower portion of bracket 131, and at their opposite and upper ends are connected to a suitable attachment plate 134 carried by the plunger and armature, the spring means normally seating valve 129 on seat 127 and urging valve return thereto.

Preferably the harp-carried cutter wire 31 is a heated wire for cutting material such as margarine. A controlled low voltage preferably is supplied to cutter wire 31 from transformer 94. The leads 135, 136 preferably connect transformer 94 to the primary of an additional transformer 137. One side of the secondary of transformer 137 is suitably coupled to a vaiable resistor 138, which is connected by a lead 139 to cutter wire 31. The opposite side of the secondary of transformer 137 is connected to wire 31 as by lead 140.

In the use of the device after assembly, as described hereinabove, the desired position of the electric eye unit 49 and light source 51 forwardly of orifice 21 is established by adjustment of the spacer means to position the forwardmost extremity of light lens 52 and photo-electric lens 53 spaced from orifice 21 a distance equal to the desired length of margarine rod which is to be cut off. It will be observed that in the assembly of the device a nozzle 19 having an orifice of desired shape, such as the circular orifice 21, has been mounted upon crystallizing unit 11.

Figure 2:
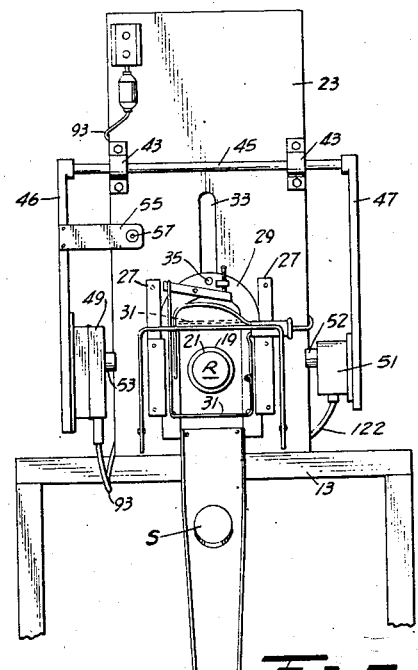
Fig. 2 is a front elevational view of the device of Fig. 1.
Figure 5:
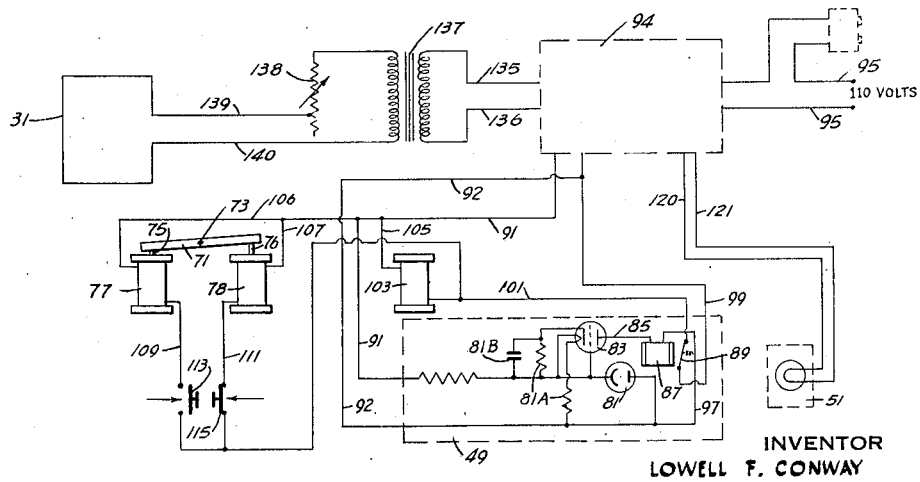
Fig. 5 is a schematic wiring diagram of the electrical control means for the device.

With the device thus set up piston 39 is positioned at one of the opposite ends of its stroke and consequently harp 29 and cutter wire 31 are positioned at the limit of travel. In Figs. 1 and 2 this positioning is shown as at the downward limit of the stroke. With the harp and the piston rod thus positioned, abutment 119 is in engagement with one of the limit switches 113, 115, being for example shown in Figs. 1 and 2 as in engagement with limit switch 115. With the limit switch thus engaged the switch is moved into make positoin, as shown in the wiring diagram, Fig. 5, and the device is ready for operation. Communication between air valve 63 and the source of air under pressure is established through air line 59.

The electrical circuits are energized by closing the switch in the 110 volt lead, thus energizing light source 51 and consequently activating the photo-electric tube 81 of unit 49, thus accomplishing energizing of relay coil 87 and instantaneously opening relay switch 89, interrupting the circuits to the respective solenoids 77, 78, 103. With the solenoid 103 thus deenergized, inlet control valve 129 is seated on valve seat 127, accommodating inlet passage 124 for communicating delivery pipe 17 with chamber inlet 15.

Margarine is delivered under pressure from delivery pipe 17 through passage 124 and inlet 15 into the chamber of crystallizing unit 11, flow thereinto filling the unit 11 under the delivering pressure. When the chamber of unit 11 has been substantially filled the continued forward movement of the mass of margarine is constricted into nozzle 19 and is extruded through orifice 21 as a rod of margarine R. As the extrusion continues the rod is projected forwardly and movement thereof continues until the mass of the margarine rod interrupts the light beam from light source 51, deactivating photo-electric unit 49 and thus deenergizing relay coil 87, releasing switch 89 to move into circuit closed position as under the urging of its spring. The closure of switch 89 as heretofore pointed out energizes inlet control solenoid 103 and simultaneously energizes one of the air valve solenoids, as for example, solenoid 78, since, as previously described, the limit switch 115 is in make position under engagement of abutment 119. The energizing of solenoid 78 causes the extension of its armature 76 affecting movement of rocker 71 and establishing communication through the air valve assembly between lower air pipe 67 and the air under pressure delivered to the air valve through air line 59, thus establishing communication with the lower portion of the interior of cylinder 41 and simultaneously establishing exhaust communication through air pipe 65 between the upper portion of the cylinder interior and exhaust vent 69.

The delivery of air under pressure causes the piston 39 to travel upwardly within cylinder 41, moving with it the piston rod and harp and cutter wire 29, 31 connected to the piston rod, moving the cutter wire across orifice 21, cleanly severing a segment of margarine S of predetermined size from the mass of margarine carried in crystallizing unit 11 and nozzle 19.

It will be observed that in its upward stroke, just described, the connector 35 and abutment 119 carried thereon are caused to overtravel substantially beyond the limits of orifice 21 and that the beginning of the upstroke immediately moves abutment 119 away from limit switch 115 deenergizing solenoid 78 and the solenoids 77, 78 continue in deenergized condition until the completion of the cutting cycle and overtravel of abutment 119 to close switch 113 energizes the opposite solenoid 77. The overtravel of abutment 119 is provided for, preferably in order to insure that the opposite limit switch 113 will not be engaged prior to downward movement of the severed segment of margarine S from orifice 21 so that reenergizing of relay coil 87 through the reactivation of photo tube 81 interrupting the solenoid circuits may be accomplished prior to shift of switch 113 into make position.

As pointed out, the extrusion of the margarine rod R to the desired distance effects interruption of the light beam and releasing switch 89 through deenergizing of coil 87 to accomplish energization of inlet solenoid 103, effecting retraction of the solenoid armature and of valve plunger 128 coupled thereto against the action of spring means 133, raising valve 129 from valve seat 127 and communicating passage 124 with atmosphere. An immediate relief is thereby provided halting the inflow of margarine from delivery pipe 17, it being found that the margarine under its delivering pressure will immediately by-pass through relief port 125 and interrupt delivery to the crystallizing unit, thus halting the extrusion of margarine from orifice 21. This feature is of importance in instantaneously halting the horizontal and forward movement of the margarine beyond orifice 21 during the time of vertical movement of the harp and cutter wire, thus eliminating the possibility of severing the segment S of margarine from the mass thereof along a diagonal line instead of a line normal to the mass of the margarine, insuring that the severed segment is of uniform thickness from edge to edge.

Immediately upon the passage of cutter wire through the rod of margarine the severed segment moves downwardly by gravity and it will be observed that due to the positioning of the light source lens and electric eye lens above the center line of orifice 21 only a very minor downward movement of the severed segment of margarine is required to reestablish the light beam activation of the photo tube and the reenergizing of relay coil 87 to act upon switch 89 and interrupt the solenoid circuits. Inasmuch as abutment 119 must continue to travel, as above described, beyond severing of the margarine segment, switch 89 is opened prior to the movement of the abutment into engagement with limit switch 113 and undesired energizing of solenoid 77 is thus prevented. With the opening of switch 89 the circuit to solenoid 103 is interrupted deenergizing the solenoid and releasing the armature and plunger 128 for return to port-closing position of valve 129 under the action of spring means 133, thus reestablishing desired communication through passage 124 between margarine 17 and chamber inlet 15, reestablishing extrusion of margarine from orifice 21. As the extrusion continues the cycle above described is repeated with the opposite solenoid 77 being energized and directing the flow of air under pressure into the upper portion of cylinder 41, causing the downstroke of the piston, piston rod and the harp and cutter wire connected thereto again severing a margarine segment S of desired size on the downstroke.

Similar to the upstroke heretofore described, the downstroke is of such length as to require abutment 119 to overtravel below segment severing position, thus delaying shift of limit switch 115 into make position to allow for downward movement of the severed margarine segment to reestablish activation of the photo-electric unit opening switch 89 in the manner described and again interrupting the respective solenoid circuits.

It thus will be seen that an accurate severing of segments of desired size may be automatically accomplished by the present device, the operation insuring coordinated cut off of material flow to eliminate the possibility of irregular severing and insuring against improper repetition of the operating cycle by the relative positioning of the photo-electric means with respect to the extrusion orifice and requiring desirable overtravel of the circuit making means to insure reestablishment of the control photo-electric activation.

I claim:

1. Means for cutting segments of uniform predetermined size from a mass of plastic margarine, comprising a crystallizing unit having a margarine inlet at one end and an extrusion nozzle having an orifice at its opposite end, means for delivering margarine under pressure to said inlet, a cutter harp including a cutter wire transversely disposed relative to said nozzle, said harp and wire being mounted for alternate opposite shift across and adjacent to said nozzle to sever margarine extruded beyond said nozzle orifice; a double action fluid pressure responsive cylinder and piston having a piston rod means coupled to said harp for effecting shift of said harp and wire when said piston is actuated, fluid pressure means, flow-directional valve means communicated with said pressure means, said valve means being flow-connected to the opposite ends of said cylinder and being shiftable alternately to and from one position in which said pressure means are communicated with one side of said piston and said piston is shifted to one end of its stroke, from and to another position in which said pressure means are communicated with the opposite side of said piston and said piston is shifted to the opposite end of its stroke, a pair of flow-directing solenoids mounted to alternately engage said valve means for effecting alternate shift of said valve means between said positions; means communicating said margarine delivering means to said unit margarine inlet including a relief port, inlet valve means closing said port to maintain margarine flow to said unit, inlet solenoid means connected to said inlet valve means for shifting said inlet valve means to open said port and interrupt margarine flow to said unit; photo-electric means mounted adjacent and spaced beyond said nozzle orifice, including a light source, a light-sensitive unit, means supporting said light source and said unit at opposite sides of said nozzle in light-communicating facing relation, adjustable spacer means connected to said supporting means for establishing and maintaining spacing of said photo-electric means beyond said orifice, said unit including a switch and being biased when activated by beams of light from said source to open said switch, deactivation of said unit upon light beam interruption effecting closure of said switch; parallel electrical circuit means respectively connected to said pair of solenoids for alternately oppositely energizing said flow-directing solenoids, additional electrical circuit means for energizing said inlet solenoid means, said circuit means including said switch and being interrupted in open condition of said switch; a pair of normally open limit switches respectively disposed for alternate switch closing engagement by said piston rod means in said piston positions, said limit switches being respectively included in the respective said parallel circuit means, one of said limit switches being closed and the other said limit switch being open in said one position of said piston to arrange said parallel circuit means to one of said pair of solenoids for shifting said flow directional valve means to the other said position when energized under closure of said photo-electric switch; margarine extruded a predetermined distance beyond said nozzle orifice interrupting light communication between said light source and said unit to actuate said piston for shift to said other position to sever said extruded margarine and simultaneously to energize said inlet solenoid to shift said inlet valve and interrupt margarine extruding flow to said unit; severance of said extruded margarine releasing the segment severed to drop therefrom and reestablish said light communication between said photo-electric means to open said photo-electric switch and interrupt said circuit means, said piston strokes being each of a length in excess of the width of said nozzle orifice to close said other limit switch subsequent to reestablishment of light communication.

2. Means for cutting segments of uniform predetermined size from a mass of plastic margarine, comprising a crystallizing unit having a margarine inlet at one end and an extrusion nozzle having an orifice at its opposite end, means for delivering margarine under pressure to said inlet, a cutter harp including a cutter wire transversely disposed relative to said nozzle, said harp and wire being mounted for alternate opposite shift across and adjacent to said nozzle to sever margarine extruded beyond said nozzle orifice; a double action fluid pressure responsive cylinder and piston having piston rod means coupled to said harp for effecting shift of said harp and wire when said piston is actuated, fluid pressure means, flow-directional valve means communicated with said pressure means, said valve means being flow-connected to the opposite ends of said cylinder and being shiftable alternately to and from one position in which said pressure means are communicated with one side of said piston and said piston is shifted to one end of its stroke, from and to another position in which said pressure means are communicated with the opposite side of said piston and said piston is shifted to the opposite end of its stroke, a pair of flow-directing solenoids mounted to alternately engage said valve means for effecting alternate shift of said valve means between said positions; means communicating said margarine delivering means to said unit margarine inlet including a relief port, inlet valve means closing said port to maintain margarine flow to said unit, inlet solenoid means connected to said inlet valve means for shifting said inlet valve means to open said port and interrupt margarine flow to said unit; photo-electric means mounted adjacent and spaced beyond said nozzle orifice, including a light source, a light-sensitive unit, means supporting said light source and said unit at opposite sides of said nozzle in light communicating facing relation, said unit including a switch and being biased when activated by means of light from said source to open said switch, deactivation of said unit upon light beam interruption effecting closure of said switch; parallel electrical circuit means respectively connected to said pair of solenoids for alternately oppositely energizing said flow-directing solenoids, additional electrical circuit means for energizing said inlet solenoid means, said circuit means including said switch and being interrupted in open condition of said switch; a pair of normally open limit switches respectively disposed for alternate switch closing engagement by said piston rod means in said piston positions, said limit switches being respectvely included in the respectve said parallel circuit means, one of said limit switches being closed and the other said limit switch being open in said one position of said piston to arrange said parallel circuit means to one of said pair of solenoids for shifting said flow-directional valve means to the other said position when energized under closure of said photo-electric switch, margarine extruded a predetermined distance beyond said nozzle orifice interrupting light communication between said light source and said unit to actuate said piston for shift to said other position to sever said extruded margarine and simultaneously to energize said inlet solenoid to shift said inlet valve and interrupt margarine extrud'ng flow to said unit; severance of said extruded margarine releasing the segment severed to drop therefrom and reestablish said light communication between said photo-electric means to open said photo-electric switch and interrupt said circuit means, said piston strokes being each of a length in excess of the width of said nozzle orifice to close said other limit switch subsequent to reestablishment of light communication.

3. Means for cutting segments of uniform predetermined size from a mass of plastic margarine, comprising a crystallizing unit having a margarine inlet at one end and an extrusion nozzle having an orifice at its opposite end, means for delivering margarine under pressure to said inlet, a cutter harp including a cutter wire transversely disposed relative to said nozzle, said harp and wire being mounted for alternate opposite shift across and adjacent to said nozzle to sever margarine extruded beyond said nozzle orifice; electrically operated shifting means coupled to said harp for alternately effecting shift in opposite directions of said harp and wire; means communicating said margarine delivering means to said unit margarine inlet including a relief port, inlet valve means closing said port to maintain margarine flow to said unit, inlet solenoid means connected to said inlet valve means for shifting said inlet valve means to open said port and interrupt margarine flow to said unit; photo-electric means mounted adjacent and spaced beyond said nozzle orifice, including a light source, a light-sensitive unit, means supporting said light source and said unit at opposite sides of said nozzle in light-communicating facing relation, means connected to said supporting means for adjusting the spacing of said photo-electric means beyond said nozzle, said unit including a switch and being biased when activated by beams of light from said source to open said switch, deactivation of said unit upon light beam interruption effecting closure of said switch; electrical circuit means connected to said electrically operated harp shifting means for alternately oppositely energizing said shifting means, additional electrical circuit means for energizing said inlet solenoid means, said circuit means including said switch and being interrupted in open condition of said switch; margarine extruded a predetermined distance beyond said nozzle orifice interrupting light communication between said light source and said unit to actuate said shifting means for shift of said wire across said nozzle to sever said extruded margarine and simultaneously to energize said inlet solenoid to shift said inlet valve and interrupt margarine extruding flow to said unit; severance of said extruded margarine releasing the segment severed to drop therefrom and reestablish said light communication between said photo-electric means to open said photo-electric switch and interrupt said circuit means.

4. Means for producing uniform segments of margarine comprising a horizontally disposed crystallizing unit, a margarine inlet into the rear end of said unit, a nozzle having a forward extrusion orifice at the front of said unit, a vertically reciprocable cutter harp having a horizontal cutter wire positioned transverse to said orifice, a double action air cylinder-and-piston assembly having a piston rod connected to said harp, electrically operated means for alternately oppositely actuating said assembly to shift said harp and wire across said orifice, a relief port rearward of said inlet, electrically shiftable valve means closing said port, light-communicated photo-electric means adjacent and beyond said orifice positioned for interruption of light communication by margarine extruded from said orifice, switch means controlled by said photo-electric means and biased to close on deactivation of said photo-electric means responsive to interruption of light communication, electric circuit means respectively connecting said switch means to said electrically operated means and said electrically shiftable valve means concurrently to actuate said cutter for margarine severing and shift said valve means to open said relief port.

5. Means for producing uniform segments of margarine comprising a crystallizing unit, a margarine inlet into one end of said unit, a nozzle having an extrusion orifice at the other end of said unit, a cutter harp having a cutter wire positioned transverse to said orifice, said harp and cutter wire being reciprocably shiftable across said orifice perpendicularly to said unit, electrically operated means for alternately oppositely shifting said harp and wire across said orifice, relief means adjacent said inlet, electrically shiftable means closing said relief means, light-communicated photo-electric means adjacent and beyond said orifice positioned for interruption of light communication by margarine extruded from said orifice, switch means controlled by said photo-electric means and biased to close on deactivation of said photo-electric means responsive to interruption of light communication, electric circuit means respectively connecting said switch means to said electrically operated means and said electrically shiftable means concurrently to actuate said cutter for margarine severing and shift said electrically shiftable means to open said relief means.

6. In a margarine cutter which includes a crystallizing unit, means connected to said unit for delivering margarine under pressure to said unit, said unit being open for margarine flow therethrough under said pressure, an extrusion nozzle and orifice for discharging a compacted rod of margarine under the pressure of said flow, and a cutter, intermittently shiftable perpendicularly to the direction of discharge from said orifice; means for halting said flow during shift of said cutter, comprising a pressure relief port interposed between said delivering means and said unit, port closing means, means coupled to said closing means for shifting said closing means to open said port and relieve said pressure, and means concurrently actuating said cutter and said shifting means responsive to margarine rod discharge a predetermined distance in said direction beyond said orifice.

7. In a margarine cutter which includes a crystallizing unit, means connected to said unit for delivering margarine under pressure to said unit, said unit being open for margarine flow therethrough under said pressure, an extrusion nozzle and orifice for discharging a compacted rod of margarine under the pressure of and in the direction of said flow, and a cutter intermittently shiftable perpendicularly to the direction of said flow; means for halting said flow during shift of said cutter, comprising a pressure relief port interposed between said delivering means and said unit, port closing means, means for shifting said closing means to open said port and relieve said pressure, photo-electric means concurrently actuating said cutter and said shifting means responsive to margarine rod discharge a predetermined distance in said direction beyond said orifice.

8. In a margarine cutter which includes a crystallizing unit, means connected to said unit for delivering margarine under pressure to said unit, said unit being open for margarine flow therethrough under said pressure, an extrusion nozzle and orifice for extending a compacted rod of margarine under the pressure of said flow, and a cutter intermittently shiftable across said orifice perpendicularly to the direction of extrusion from said orifice; means for halting said flow during shift of said cutter, comprising a pressure relief port interposed between said delivering means and said unit, port closing means, means coupled to said port closing means for shifting said closing means to open said port and relieve said pressure, light-communicated photo-electric means concurrently actuating said cutter and said shifting means responsive to light interrupting extrusion of a portion of said margarine a predetermined distance in said direction beyond said orifice, cutter shift severing the extruded portion of the margarine rod to drop by gravity and reestablish light communication of said photo-electric means, whereby to interrupt actuation of said cutter and said shifting means to repeat said rod extrusion.

9. In a device for severing uniform segments from a mass of margarine, a chamber, an orifice communicated with one end of said chamber for discharge from said chamber, margarine delivery means, means communicating said delivery means with said chamber adjacent its other end for margarine delivery flow into said chamber, valve means interposed in said communicating means between said delivery means and said chamber, said valve means being shiftable to and from a first position in which said communicating means is blocked and margarine delivery flow diverted from said chamber from and to a second position in which flow diversion is interrupted and margarine delivery flow to said chamber is established, cutter means positioned adjacent said orifice, and operating means coupled to said valve means and to said cutter means, a part of said operating means being adjacent said orifice in the path of margarine discharged from said orifice, impingement of said part by discharged margarine activating said operating means to effect operation of said cutter means and concurrent shift of said valve means to said first position, whereby to divert delivery flow away from said chamber and interrupt discharge flow from said orifice concurrently with operation of said cutter means.

10. In a device for severing uniform segments from a mass of margarine, a chamber, an orifice communicated with one end of said chamber for discharge from said chamber, margarine delivery means, means communicating said delivery means with said chamber adjacent its other end for margarine delivery flow into said chamber, valve means interposed in said communicating means between said delivery means and said chamber, said valve means being shiftable to and from a first position in which said communicating means is blocked and margarine delivery flow diverted from said chamber from and to a second position in which flow diversion is interrupted and margarine delivery flow to said chamber is established, cutter means positioned adjacent said orifice, and electrical circuit means operatively coupled to said valve means and to said cutter means, a part of said circuit means being adjacent said orifice and across the path of margarine discharged from said orifice, impingement of said part by discharged margarine interrupting said circuit means to effect operation of said cutter means and concurrent shift of said valve means to said first position, whereby to divert delivery flow away from said chamber and interrupt discharge flow from said orifice concurrently with operation of said cutter means.

11. In a device for severing uniform segments from a mass of margarine, a chamber, an orifice communicated with one end of said chamber for discharge from said chamber, margarine delivery means, means communicating said delivery means with said chamber adjacent its other end of margarine delivery flow into said chamber, valve means interposed in said communicating means between said delivery means and said chamber, said valve means being shiftable to and from one position in which said communicating means is blocked and margarine delivery flow diverted from said chamber from and to another position which flow diversion is interrupted and margarine delivery flow to said chamber is established, cutter means positioned adjacent said orifice, and electrical circuit means operatively coupled to said valve means and to said cutter means, said circuit means including photo-electric beam-producing and beam-responsive elements adjacent said orifice projecting a light-beam across the path of margarine discharged from said orifice, advancement of discharged margarine interrupting said circuit means beam to effect operation of said cutter means and concurrent shift of said valve means to said one position, whereby to divert delivery flow away from said chamber and interrupt discharge flow from said orifice concurrently with operation of said cutter means.

12. Means for cutting segments of uniform predetermined size from a mass of plastic material, comprising an extrusion unit having an inlet at one end and an extrusion nozzle having an orifice at its opposite end, means for delivering plastic material under pressure to said inlet, a cutter harp including a cutter wire transversely disposed relative to said nozzle, said harp and wire being mounted for alternate opposite shift across and adjacent to said nozzle to sever plastic material extruded beyond said nozzle orifice; electrically operated shifting means coupled to said harp for alternately effecting shift in opposite directions of said harp and wire; means communicating said delivering means to said unit inlet including a relief port, inlet valve means closing said port to maintain flow to said extrusion unit, electrically operated shifting means connected to said inlet valve means for shifting said inlet valve means to open said port and interrupt flow to said extrusion unit; photo-electric means mounted adjacent and spaced beyond said nozzle orifice, including a light source, a light-sensitive unit, means supporting said light source and said light-sensitive unit at opposite sides of said nozzle in light-communicating facing relation, means connected to said supporting means for adjusting the spacing of said photo-electric means beyond said nozzle, said light-sensitive unit including a switch and being biased when activated by beams of light from said source to open said switch, deactivation of said light-sensitive unit upon light beam interruption effecting closure of said switch; electrical circuit means connected to said electrically operated harp shifting means for alternately oppositely energizing said shifting means, additional electrical circuit means for energizing said electrically operated valve shifting means, said circuit means including said switch and being interrupted in open condition of said switch; plastic material extruded a predetermined distance beyond said nozzle orifice interrupting light communication between said light source and said light-sensitive unit to actuate said shifting means for shift of said wire across said nozzle to sever said extruded plastic material and simultaneous shift of said inlet valve to interrupt extruding flow to said extrusion unit; severance of said extruded plastic material releasing the segment severed to drop therefrom and reestablish said light communication between said photo-electric means to open said photo-electric switch and interrupt said circuit means.

13. Means for cutting segments of uniform predetermined size from a mass of plastic material, comprising an extrusion unit having an inlet at one end and an extrusion nozzle having an orifice at its opposite end, means for delivering plastic material under pressure to said inlet, a cutter harp including a cutter wire transversely disposed relative to said nozzle, said harp and wire being mounted for alternate opposite shift across and adjacent to said nozzle to sever plastic material extruded beyond said nozzle orifice; electrically operated shifting means coupled to said harp for alternately effecting shift in opposite directions of said harp and wire; means communicating said delivering means to said unit inlet including a relief port, inlet valve means closing said port to maintain flow to said extrusion unit, electrically operated shifting means connected to said inlet valve means for shifting said inlet valve means to open said port and interrupt flow to said extrusion unit; photo-electric means mounted adjacent and spaced beyond said nozzle orifice, including a light source, a light-sensitive unit, means supporting said light source and said light-sensitive unit at opposite sides of said nozzle in light-communicating facing relation, said light-sensitive unit including a switch and being biased when activated by beams of light from said source to open said switch, deactivation of said light-sensitive unit upon light beam interruption effecting closure of said switch; electrical circuit means connected to said electrically operated harp shifting means for alternately oppositely energizing said shifting means, additional electrical circuit means for energizing said electrically operated valve shifting means, said circuit means including said switch and being interrupted in open condition of said switch; plastic material extruded a predetermined distance beyond said nozzle orifice interrupting light communication between said light source and said light-sensitive unit to actuate said shifting means for shift of said wire across said nozzle to sever said extruded plastic material and simultaneous shift of said inlet valve to interrupt extruding flow to said extrusion unit; severance of said extruded plastic material releasing the segment severed to drop therefrom and reestablish said light communication between said photo-electric means to open said photo-electric switch and interrupt said circuit means.

References Cited in the file of this patent

UNITED STATES PATENTS

| | | |
|---|---|---|
| 1,715,210 | Pedersen | May 28, 1929 |
| 1,892,705 | Patitz et al. | Jan. 3, 1933 |
| 2,051,781 | Brown | Aug. 18, 1936 |
| 2,310,858 | Miller | Feb. 9, 1943 |
| 2,528,779 | Pinney | Nov. 7, 1950 |